United States Patent [19]

Luallin et al.

[11] Patent Number: 5,483,425
[45] Date of Patent: Jan. 9, 1996

[54] QUICK RELEASE VEHICLE HEADLAMP ARRANGEMENT

[75] Inventors: John M. Luallin, Anderson; Steven V. Horsman, Indianapolis; Brian E. Witte, Anderson, all of Ind.

[73] Assignee: General Motors Corporation, Detroit, Mich.

[21] Appl. No.: 358,116

[22] Filed: Dec. 19, 1994

[51] Int. Cl.⁶ .................................................. B60Q 1/04
[52] U.S. Cl. ............................. 362/61; 362/66; 362/289; 362/421
[58] Field of Search ................................. 362/61, 66, 80, 362/273, 284, 289, 421

[56] References Cited

U.S. PATENT DOCUMENTS

| | | | |
|---|---|---|---|
| 2,859,060 | 11/1958 | Davies et al. | 287/90 |
| 3,862,807 | 1/1975 | Doden et al. | 403/135 |
| 4,679,958 | 7/1987 | Mizusawa et al. | 403/143 |
| 4,707,769 | 11/1987 | Van Duyn | 362/66 |
| 4,707,770 | 11/1987 | Van Duyn | 362/66 |
| 4,707,771 | 11/1987 | Van Duyn et al. | 362/66 |
| 4,901,208 | 2/1990 | DePetro | 362/66 |
| 4,904,107 | 2/1990 | Fukukawa et al. | 403/122 |
| 4,974,123 | 11/1990 | Luallin et al. | 362/421 X |
| 5,045,987 | 9/1991 | Hebert | 362/421 |
| 5,153,976 | 10/1992 | Benchaar et al. | 29/436 |
| 5,313,374 | 5/1994 | Pinson | 362/421 X |
| 5,360,282 | 11/1994 | Nagengast et al. | 403/131 |

*Primary Examiner*—Stephen F. Husar
*Attorney, Agent, or Firm*—Ernest E. Helms

[57] ABSTRACT

An arrangement of an aimable vehicle headlamp assembly is provided which includes a bulb; a reflector housing mounting the bulb; at least one rod with a balled end mounted to the vehicle and extending therefrom, the balled end having first and second sides; a first sleeve housing encircling the rod having an open end for receipt of the first side of the rod balled end; a second sleeve housing connected to the housing with an open end for receipt of the second side of the rod balled end; and a flange connected to one of the sleeve housings for receipt into a groove in the sleeve housing the flange is not connected to. Pivotal connection of the reflector housing to the rod is achieved by insertion of one of the sleeve housings into the other sleeve housing and torquing one of the sleeve housings, and placing the flange in one of the sleeve housings within the groove of the other sleeve housing.

6 Claims, 3 Drawing Sheets

5,483,425

QUICK RELEASE VEHICLE HEADLAMP ARRANGEMENT

FIELD OF THE INVENTION

The field of the present invention is that of vehicle headlamp assemblies for automotive vehicles, particularly composite-type headlamp assemblies having replaceable bulbs.

BACKGROUND OF THE INVENTION

Many modern vehicular headlamps with aerodynamic styling provide for smaller lenses and replaceable halogen bulbs. The replaceable bulb arrangement permits the lens and reflector housing to remain in place on the vehicle and only requires that the smaller halogen bulb be replaced should a bulb burn out and require servicing. Most replaceable bulb headlamps provide for room behind the headlamp for bulb servicing. The reflector housing remains fixably connected to the car body. When the bulb burns out, room for a hand must be provided to remove the old bulb and for insertion of the replacement bulb while the reflector housing is in place. The servicing requirement often results in access holes in the support panels or extra room being provided for access from the top of the headlamp after a vehicle hood is raised.

Many newer vehicle stylings have smaller hoods, with the headlamp being placed under the fender panel, restricting service access. To attach a reflector housing to a panel connected to the vehicle, many headlamp assemblies are provided with special attaching screws that must be removed to release the headlamp for servicing. It is desirable to provide a headlamp attaching system that does not require the utilization of special tools and which ensures continued proper aim of the headlamp assembly, does not require hand access directly behind the reflector housing and is easy for servicing, allowing a vehicle owner to service the headlamp without resorting to a mechanic or dealer repair specialist. Additionally, the attachment system should allow a minimum space requirement, thereby minimizing weight and maximizing positive aerodynamic capabilities to enhance the environmental efficiency of the vehicle.

SUMMARY OF THE INVENTION

The present meets the above-noted needs by providing a headlamp assembly which can be connected to or removed from a fixed panel in the vehicle by simply torquing a ball and socket connection. The present invention is an alternative to the inventions disclosed in U.S. Pat. Nos. 5,428,511 and 5,424,923.

Additional advantages of the present invention will be apparent to those skilled in the art as the invention is revealed in the accompanying drawings and detailed description.

DESCRIPTION OF THE PREFERRED EMBODIMENT

Figure 1:
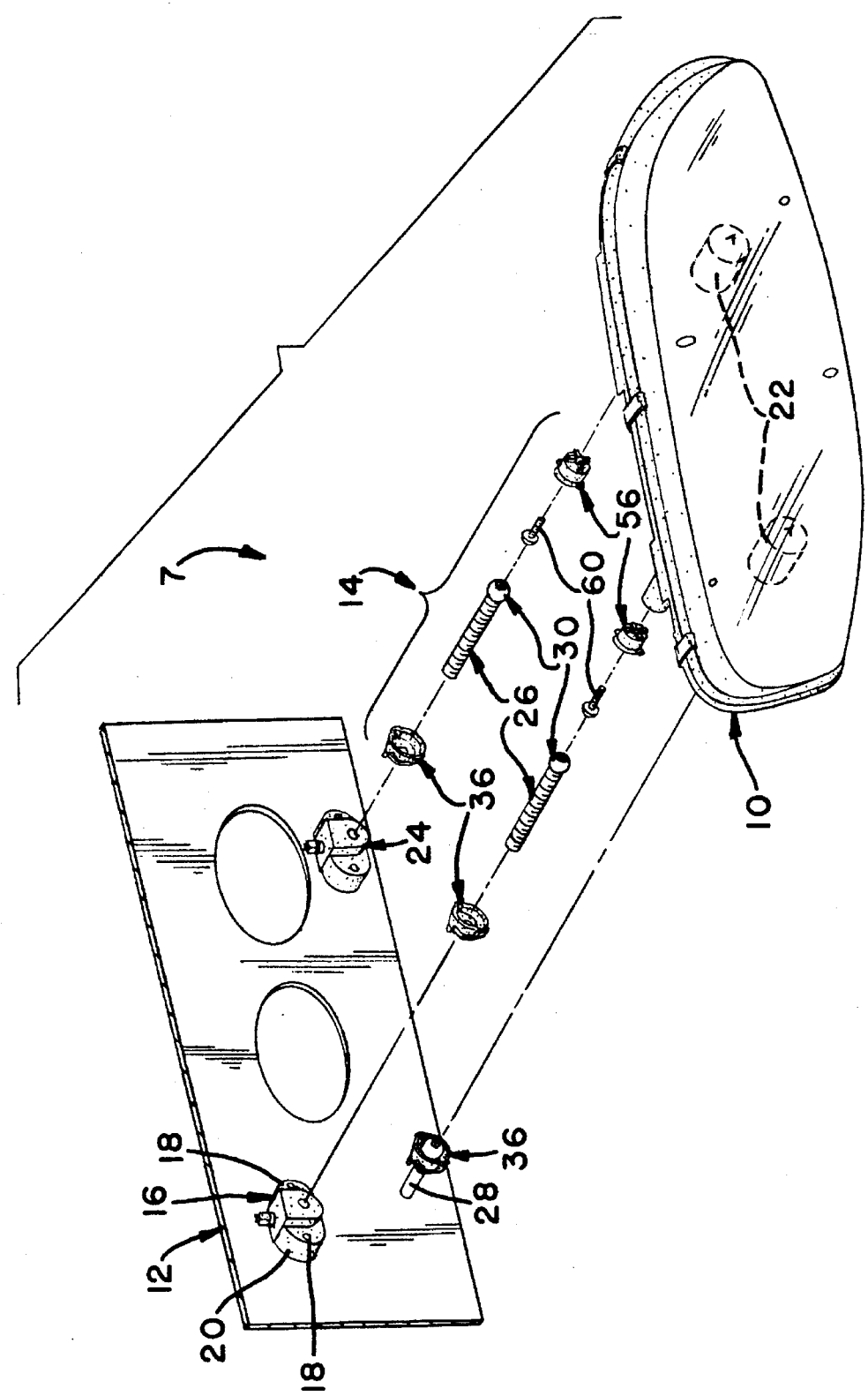
FIG. 1 is an exploded view of a vehicle headlamp mounting arrangement according to the present invention.

In FIG. 1, there is a view of the complete arrangement 7 as it is used to attach a reflector housing assembly 10 to a mounting bracket 12. The reflector housing 10 mounts bulbs 22 to provide a source of illumination. The mounting bracket 12 attaches directly to a fixed portion of a vehicle (not shown). Three quick connect rod attachment assemblies 14 are used for each reflector housing assembly 10 (only two are shown in FIG. 1), each permitting the removal of the reflector housing assembly 10 from the vehicle for servicing.

FIG. 1 shows a vertical adjuster 16 that attaches to the mounting bracket 12 with two screws (not shown) that are driven from the rear of the mounting bracket through holes 18 into the adjuster boss 20. In a similar manner, a horizontal adjuster 24 is also fixably connected to the mounting bracket 12. Each adjuster 16, 24 has a rod 26 which is extendable to aim the reflector housing assembly 10. A third rod 28 provides a fixed pivot point for the reflector housing assembly 10.

The attachment assemblies 14 for rods 26 and 28 are the same. Therefore, in the interest of brevity, only one is explained. Each rod 26 has a balled end 30 with a first side 32 and a second side 34. Encircling the rod 26 is a first sleeve housing 36. The first sleeve housing 36 has an open end 38 for receipt of side 32 of the balled end. Typically, the first sleeve 36 will be made from nylon material.

Figure 3:
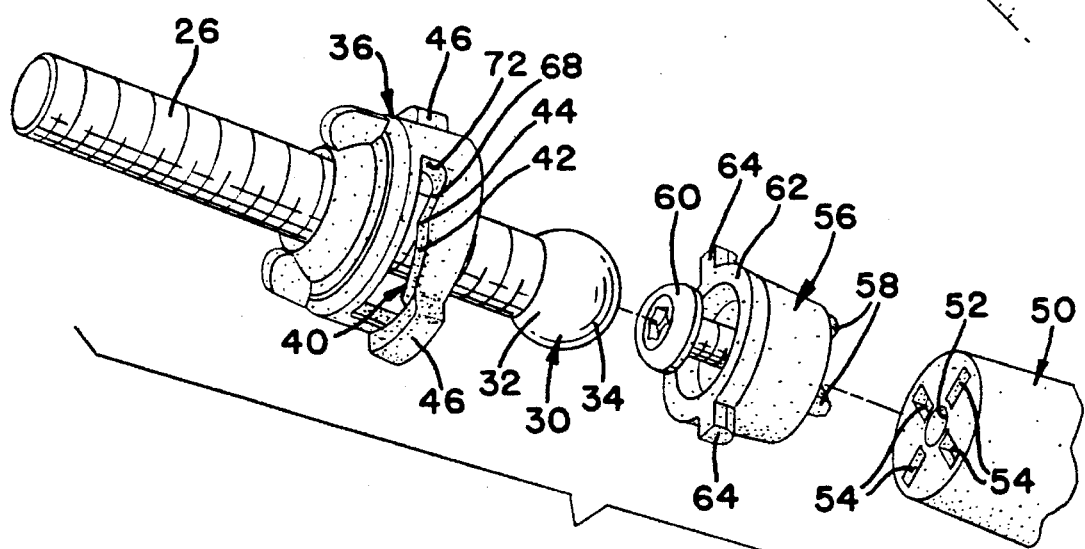
Figure 4:
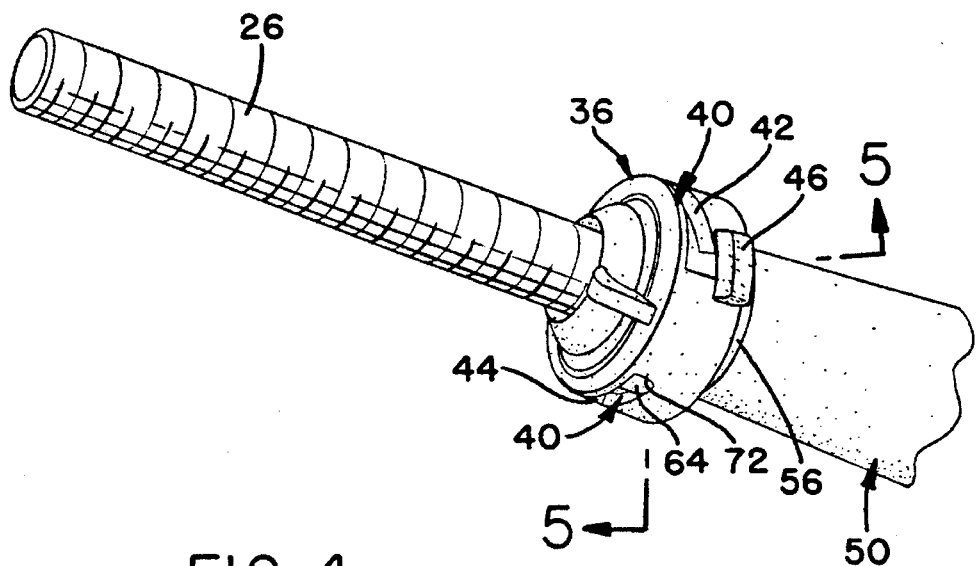
FIG. 4 is an enlarged perspective view of the rod first and second sleeves and the housing stud according to the present invention in a fully assembled state.

The first sleeve has two opposing grooves 40 with a ramp surface 42 with a peak 44. There is a thumb tab 46 on the top (leftward end in FIG. 3) of the first sleeve 36.

For each rod 26, 28, the reflector housing assembly 10 has a boss 50 with a bore 52 surrounded by alignment depressions 54. A second sleeve housing 56 has projections 58 to fit within the depressions 54 to aid in the prevention of rotation of the sleeve 56. A screw 60 passes through an open end 62 of the second sleeve housing 56 to attach the same to the reflector housing assembly 10. The second sleeve housing 56 has two radially projecting flanges 64. The open end 62 of the second sleeve housing receives the second ball end face 34.

The quick release ball socket assembly 14 attaches to a special boss 50 on the reflector housing 10.

Figure 2:
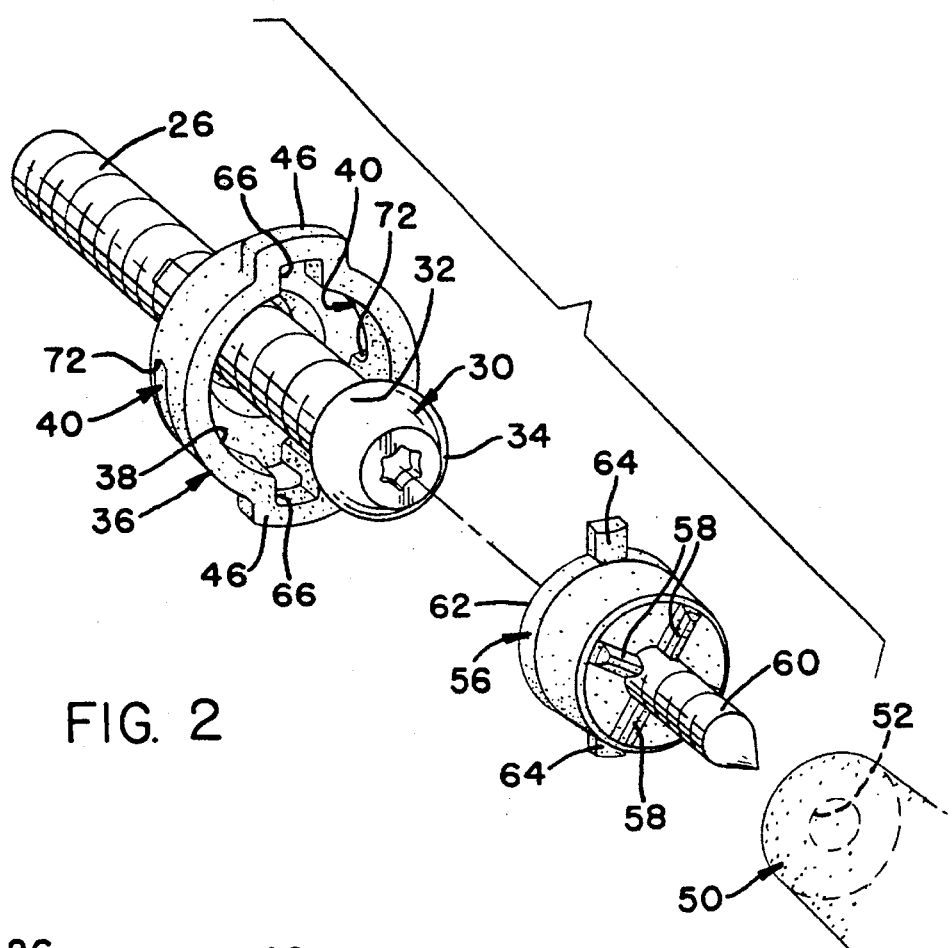
FIGS. 2 and 3 are exploded perspective views illustrating the rod with the ball end and the two sleeves of the present invention, along with the screw which mounts the second sleeve to the reflector housing.
Figure 5:
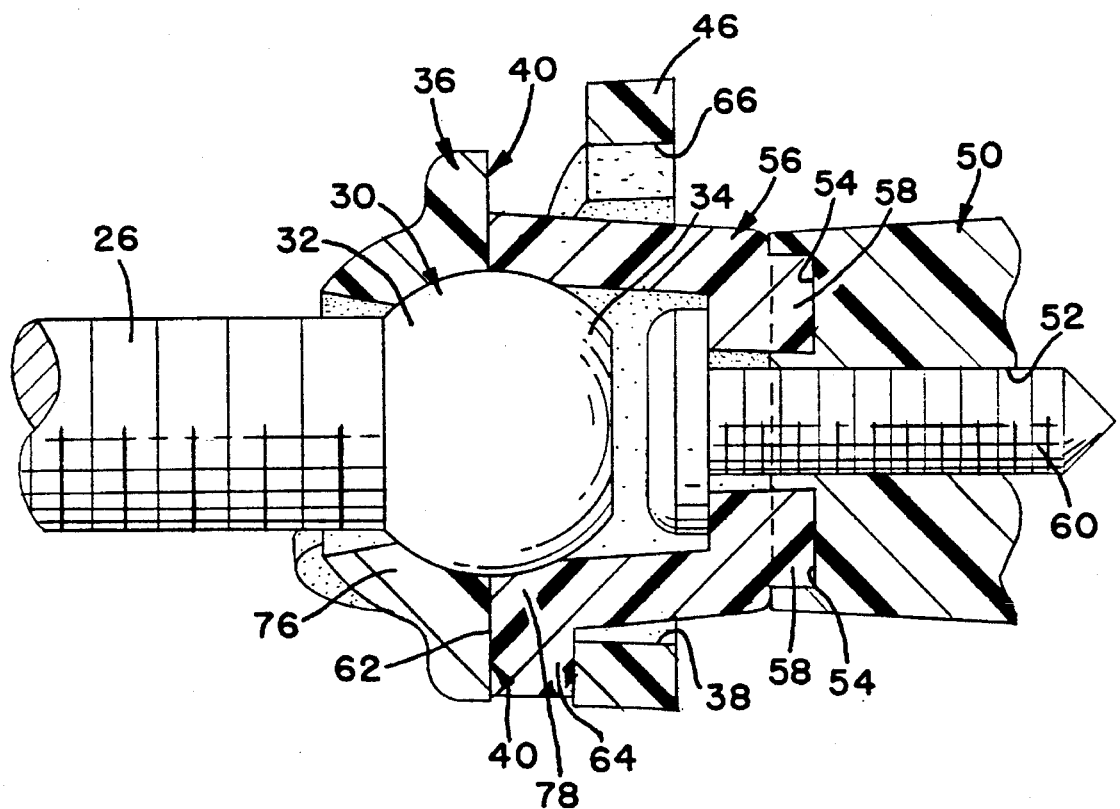
FIG. 5 is an enlarged sectional view taken along line 5—5 of FIG. 4.

To assemble the two sleeve housings 36, 56 on the balled end 30, the second sleeve housing 56 is oriented so that the flanges 64 can enter axial slots 66 and move (upward in FIG. 2) into opening 38 until the first sleeve touches the first side 32 of the balled end 30 and the second sleeve touches the second side 34 of the balled end 30, whereupon the first sleeve housing 36 is rotated with thumb tabs 46 and the flanges 64 travel up the ramp surfaces 42 (only one of two are shown), across the peak 44 and downward on until they hit stop 72 provided by the end of groove 40. The "peak" and the downward ramp portion 68 act as a compliant spring overlock anti-rotation feature to maintain engagement of the two sleeve housings 36 and 56. There is a slight expansion of the sleeve housings 36, 56 side walls 76, 78 (see FIG. 5) around the balled end 30 that keeps the sleeve housings 36, 56 in enough compression so as to maintain an assembled state once rotated into the fully-assembled position (i.e., once the flanges 64 hit stops 72). The above-noted compression state is created because the interior pocket of the ball socket (created by the two sleeve housings 36, 56) is slightly smaller than the outer diameter of the balled end 30 of the rod 26.

The assembly 14 can pivot during headlamp aiming as the rods 26 are extended or retracted during aiming of the reflector housing assembly 10.

For disassembly, rotation of the first sleeve housing 36 the twisthalf of the socket so as to move the lock flanges 64 up the ramp portion 68, past peak 44 and down the remainder of the ramp surface 42 until the flanges 64 can exit through axial slots 66 and permit the two sleeve housings 36, 56 to separate.

While this invention has been described in terms of a preferred embodiment thereof, it will be appreciated that other forms could readily be adapted by one skilled in the art. Accordingly, the scope of this invention is to be considered limited only by the following claims.

The embodiments of the invention in which an exclusive property or privilege is claimed are defined as follows:

1. An arrangement of an aimable vehicle headlamp assembly fixably connected to a fixed portion of a vehicle, the arrangement comprising:

a bulb providing a source of illumination;

a reflector housing mounting the bulb;

at least one rod with a balled end mounted to the fixed portion of the vehicle and extending therefrom, the balled end having first and second sides;

a first sleeve housing encircling the rod, having an open end for receipt of the first side of the rod balled end;

a second sleeve housing connected to the housing with an open end for receipt of the second side of the rod balled end; and a flange connected to one of the sleeve housings for receipt into a groove in the sleeve housing the flange is not connected to, and wherein pivotal connection of the reflector housing to the rod is achieved by insertion into one of the sleeve housings into the other sleeve housing and torquing of one of the sleeve housings, placing the flange in one of the sleeve housings within the groove of the other sleeve housing.

2. A vehicle headlamp assembly as described in claim 1 wherein the sleeve housing has two flange members and wherein there are two grooves within the other sleeve housing for receipt of the two flanges.

3. A vehicle headlamp assembly as described in claim 1 wherein the rod is extendable with respect to the fixed portion of the vehicle.

4. A vehicle headlamp assembly as described in claim 1 wherein the first sleeve housing has the groove.

5. A vehicle headlamp assembly as described in claim 1 wherein there is a compliant spring overlock association between the flange and the groove of the sleeve housings.

6. An arrangement of an aimable vehicle headlamp assembly fixably connected to a fixed portion of a vehicle, the arrangement comprising:

a bulb providing a source of illumination;

a reflector housing mounting the bulb;

at least one rod with a balled end mounted to the fixed portion of the vehicle and extending therefrom in an extendable manner, the balled end of the rod having first and second sides;

a first sleeve housing encircling the rod, having an open end for receipt of the first side of the rod balled end, the first sleeve housing having at least two geometrically spaced radial grooves;

a second sleeve housing fixably connected to the reflector housing having an open end for receipt of the second side of the rod ball, the second sleeve housing having flanges for receipt into the grooves of the first sleeve housing wherein pivotal connection of the reflector housing to the rod is achieved by insertion of the second sleeve housing into the first sleeve housing and torquing of the first sleeve housing, placing the flanges into the groove in a compliant spring overlock fashion.

* * * * *